Patented Aug. 5, 1924.

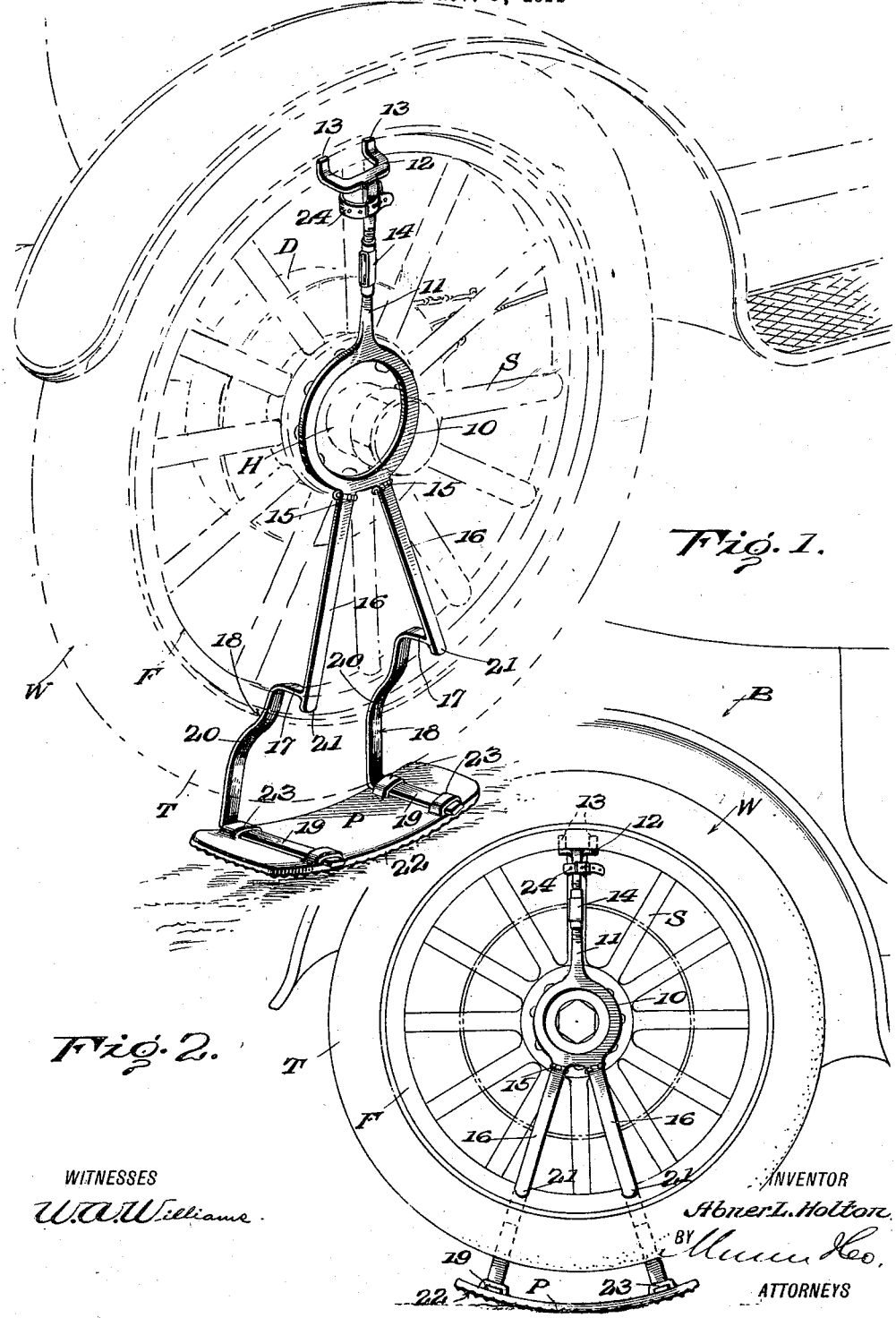

1,503,532

UNITED STATES PATENT OFFICE.

ABNER L. HOLTON, OF BIG STONE GAP, VIRGINIA.

LIFTING JACK FOR MOTOR VEHICLES.

Application filed November 3, 1922. Serial No. 598,832.

*To all whom it may concern:*

Be it known that I, ABNER L. HOLTON, a citizen of the United States, and a resident of Big Stone Gap, in the county of Wise and State of Virginia, have invented certain new and useful Improvements in Lifting Jacks for Motor Vehicles, of which the following is a specification.

This invention relates to a lifting jack for motor vehicles or the like.

The invention more particularly relates to the type of lifting jack in which the motive power of a vehicle is utilized for elevating one or more of its wheels.

A general object of the invention is to provide a device of the above character which may be quickly and easily applied to a wheel of a motor vehicle and serve to elevate said wheel when the motor vehicle is either advanced or moved rearward a predetermined degree.

It is also an important object of the invention that the lifting device be adapted to be applied to any construction of motor vehicle wheel or to either the front or rear wheel of a motor vehicle.

A further object of the invention is that the device is foldable so that the same may be positioned in a tool box or the like carried by a motor vehicle.

It is also within the scope of the objects of the invention that the present device be extremely simple in construction and inexpensive to manufacture.

Other objects and advantages relating to details of construction, combination and arrangement of parts will hereinafter appear in the detailed description to follow.

The invention is illustrated by way of example in the accompanying drawings, in which:

Figure 1 is a detail perspective view showing the application of the present invention to the rear wheel of a motor vehicle, and Figure 2 is a detail view in side elevation of the same.

Referring to the drawings more particularly, B indicates generally a rear end portion of the body of a motor vehicle and W a supporting wheel therefor. Referring to the wheel, S indicates the spokes thereof, H the hub, F the felly, T the tire, which is pneumatic, and D the usual brake drum.

In carrying out the present invention, I provide what may be termed a frame comprising a ring or annular formation 10 having radiating therefrom an arm 11 which terminates at its free end in a laterally extending U-shaped member 12 and each leg of said U-shaped member terminating in an upwardly extending projection 13. In the arm 11 there is inserted a turn buckle generally indicated by the reference numeral 14. At a point substantially diametrically opposed to the arm 11, there is hinged as at 15 to the ring 10 a pair of arms 16. The hinges 15 are adapted to permit the arm 16 to swing in one direction only, for a purpose which will later become apparent. Adjacent the free end of each arm 16, there is provided a lateral projection 17 which terminates in a downwardly extending member 18 and said member or portion 18 terminating in a laterally extending portion 19. The portion 18 is bent outwardly as at 20 in order that the same may conform to the curvature of a pneumatic tire. It will also be observed that each arm 16 slightly extends beneath the lateral projection 17, as at 21.

A tread plate, generally indicated by the reference character P, is provided and is preferably of the length shown. This tread plate should be arcuate in shape, that is longitudinally thereof, and may be made of thin sheet metal with the lower or bottom surface thereof corrugated, as indicated at 22. Upon the upper face of the plate P and adjacent each corner thereof, there is provided an apertured lug 23, the aperture of each lug being adapted to receive an extension 19 of either of the arms 16. It is to be understood from this construction that the plate P is freely detachable from the arms 16. The plate P may be termed a ground-engaging means for the lifting jack.

In the use of the present device, the arms 16 may be unfolded and the plate P removed. The ring, together with the arm 14 and arms 16 which constitute a frame as heretofore referred to, may now be positioned upon the wheel to be elevated. As is seen in Fig. 1 of the drawings, the frame is positioned upon the outer side of the wheel. In positioning the frame, the lower end portions of the arm 16 should be extended between spokes of the wheel, as shown, and then the ring 10 brought to encircle the hub of the wheel. The arm 14 is now positioned so that the U-shaped extension 12 is seated immediately beneath or upon the inner side of the wheel felly and the prongs or extensions 13 engaging upon the inner side of the wheel felly. The laterally extending portions 17 of the arms 16 at this time engage upon the inner periphery of the wheel felly and the projections 21 serve to hold the arms against lateral movement in one direction. If desired, the turn-buckle 14 may be utilized for adjusting the length of the frame in order that its ends may properly engage with the wheel felly. The ground-engaging plate P may now be positioned as shown, and the device is fully attached for elevating the wheel upon the motor vehicle being advanced or moved in a rearward direction a sufficient degree to bring the ground-engaging plate P directly therebeneath.

It should be here pointed out that if desired the ground-engaging plate P may be dispensed with, that is, the extensions 19 of the arms 16 would serve to elevate the wheel when brought therebeneath. Also, in case that the plate P is dispensed with, it is obvious that the arm extensions 19 would serve to hold the wheel against forward or rearward movement after the same has been elevated.

It also should be noted that the ground-engaging plate P is of considerable length and thus permits a relatively long interval during the raising movement of a wheel, so that the operator of the motor vehicle may more accurately judge when the ground-engaging plate or supporting plate is in proper position. Further, by providing the lower face of the plate P with corrugations or ribs a better gripping surface is formed and also if this plate is moving over a hard surface, it will aid the operator of the motor vehicle in judging the position of the plate with respect to the wheel.

The device after serving its purpose, that is, for elevating a wheel, may be quickly and easily removed. In removing the device, the plate P must first be removed and then the frame, constituting the ring 10 and arms radiating therefrom. The arms 16 may be folded upon the ring 10 and the frame placed in the tool box or like receptacle of the associated motor vehicle and then the plate P placed separately in the tool box.

While I have shown and described the preferred form of my invention, I wish it to be understood that I am aware of the fact that the general construction, combination, and arrangement of parts might be changed by those skilled in the art, without departing from the spirit of the invention or the scope of the appended claims.

It will be further noted that the arm 11 carries a strap 24 which may be used to further secure the frame, constituting the ring 10 and arms radiating therefrom, to a wheel.

I claim:—

1. In combination, a wheel, a frame adapted to be extended across the full internal diameter of the wheel and having means to effectively engage opposed points of the felly of said wheel, and ground-engaging means carried by one end of the frame adapted to elevate the wheel when said wheel is rotated a predetermined degree.

2. In combination, a wheel, a frame adapted to be extended across the full internal diameter of the wheel and having means to effectively engage opposed points of the felly of said wheel, ground-engaging means carried by one end of the frame adapted to elevate the wheel when said wheel is rotated a predetermined degree, and means for adjusting the length of said frame for the purpose described.

3. In combination, a wheel, a frame adapted to be positioned upon one side of the wheel and extend across the full internal diameter of the wheel, said frame having means to effectively engage substantially diametrically opposed points of the felly of said wheel, and ground-engaging means carried by one end of the frame adapted to elevate the wheel when said wheel is rotated a predetermined degree.

4. In combination, a wheel, a frame adapted to be extended across the full internal diameter of the wheel and between opposed points of the felly of said wheel, means carried by the frame ends adapted to engage the felly for holding the same against lateral movement in either direction, and means carried at one end of the frame adapted to elevate the wheel when said wheel is rotated a predetermined degree.

5. In combination, a wheel, a frame adapted to be extended across the full internal diameter of the wheel and between opposed points of the felly of said wheel, means carried by the frame ends adapted to engage the felly for holding the same against lateral movement, and means carried at one end of the frame adapted to extend about one side of the wheel felly and then transversely of the outer periphery of the wheel, said means being adapted to elevate the wheel when said wheel is rotated a predetermined degree.

6. In combination, a wheel, a frame adapted to be extended across the full internal diameter of the wheel and between opposed points of the felly of said wheel, means carried by the frame ends adapted to engage the felly for holding the same against lateral movement, and prongs extending from one end of the frame about one side of the felly of said wheel and then transversely to the periphery of said wheel whereby said wheel may be elevated when rotated to bring said prongs therebeneath.

7. In combination, a wheel, a frame adapted to be extended across the full internal diameter of the wheel and between opposed points of the felly of said wheel, means carried by the frame ends adapted to engage the felly for holding the same against lateral movement, prongs extending from one end of the frame about one side of the felly of said wheel and then transversely to the periphery of said wheel, and a detachable tread plate adapted to be positioned upon said prong and serve to elevate said wheel when brought directly therebeneath.

8. A device of the character described, comprising a frame adapted to be positioned upon a wheel and extend across the full internal diameter of the wheel and having means to effectively engage opposed points of the felly of said wheel, and ground-engaging means carried by one end of the frame whereby the wheel will be elevated when rotated to bring said ground-engaging means therebeneath.

9. A device of the character described, comprising a frame adapted to be positioned upon a wheel and extend across the full internal diameter of the wheel and having means to effectively engage opposed points of the felly of said wheel, and detachable ground-engaging means carried by one end of the frame whereby the wheel will be elevated when rotated to bring said ground-engaging means therebeneath.

10. A device of the character described, comprising a frame consisting in a ring adapted to be positioned loosely about the hub of a wheel and upon the outer side of the wheel, arms extending from said ring and having means to engage the felly of said wheel at substantially diametrically opposed points whereby to support the frame upon the wheel independent of the hub, and ground-engaging means carried by certain of said arms whereby to elevate the wheel when said wheel is rotated to bring the ground-engaging means therebeneath.

11. A device of the character described, comprising a frame consisting in a ring adapted to be positioned about the hub of a wheel and upon the outer side of the wheel, an arm radiating from said ring adapted to engage the felly of the wheel, a second arm hinged to said ring and extending radially therefrom, the second arm being adapted to engage the felly of a wheel at a point substantially diametrically opposite to the engagement of the first-named arm, and a ground-engaging means carried by the last named arm whereby the wheel will be elevated when rotated to bring the ground-engaging means therebeneath.

12. A device of the character described comprising a frame consisting in a ring adapted to be positioned about the hub of a wheel and upon the outer side of the wheel, an arm radiating from said ring the free end of which is adapted to engage the felly of the wheel, a second arm hinged to said ring and extending radially therefrom and adapted to engage the felly of the wheel, means carried upon the free end of each of said arms whereby to hold the frame upon the wheel, and means extending from the second named arm adapted to encircle upon one side the felly of the wheel and extend transversely to the periphery of the wheel whereby upon the wheel being rotated a predetermined degree, said wheel will be elevated.

13. A device of the character described comprising a frame having spaced apart members to engage a wheel felly at three points therearound, a ground engaging member, and connections supported by a pair of said felly engaging members to detachably support said ground engaging member.

14. A device of the character described comprising a frame having means to surround the hub of a wheel and including radial members having means engageable at three points of the felly of the wheel to support the frame on the wheel independent of the hub of the latter, and a ground engaging shoe detachably supported by certain of said members.

ABNER L. HOLTON.